(12) United States Patent
Nobuta et al.

(10) Patent No.: US 11,908,634 B2
(45) Date of Patent: Feb. 20, 2024

(54) ELECTROLYTIC CAPACITOR AND MANUFACTURING METHOD OF ELECTROLYTIC CAPACITOR

(71) Applicant: JAPAN CAPACITOR INDUSTRIAL CO., LTD., Tokyo (JP)

(72) Inventors: Tomoki Nobuta, Nagaokakyo (JP); Kazumasa Fujimoto, Nagaokakyo (JP)

(73) Assignee: JAPAN CAPACITOR INDUSTRIAL CO., LTD., Tokyo (JP)

( * ) Notice: Subject to any disclaimer, the term of this patent is extended or adjusted under 35 U.S.C. 154(b) by 103 days.

(21) Appl. No.: 17/600,481

(22) PCT Filed: Jan. 17, 2020

(86) PCT No.: PCT/JP2020/001558
§ 371 (c)(1),
(2) Date: Sep. 30, 2021

(87) PCT Pub. No.: WO2021/049050
PCT Pub. Date: Mar. 18, 2021

(65) Prior Publication Data
US 2022/0172903 A1   Jun. 2, 2022

(30) Foreign Application Priority Data
Sep. 9, 2019 (JP) .................................. 2019-163668

(51) Int. Cl.
*H01G 9/10* (2006.01)
*H01G 9/012* (2006.01)
(Continued)

(52) U.S. Cl.
CPC .............. *H01G 9/10* (2013.01); *H01G 9/012* (2013.01); *H01G 9/052* (2013.01); *H01G 9/15* (2013.01)

(58) Field of Classification Search
CPC ............. H01G 9/15; H01G 2/24; H01G 9/012
See application file for complete search history.

(56) References Cited

U.S. PATENT DOCUMENTS 6,380,577 B1 * 4/2002 Cadwallader .......... H01G 9/012
257/923
2003/0223180 A1 * 12/2003 Aoyama .................. H01G 9/15
361/523

(Continued)

FOREIGN PATENT DOCUMENTS

CN   102254683 A   11/2011
CN   109804445 A   5/2019

(Continued)

OTHER PUBLICATIONS

Chinese Search Report issued for counterpart Chinese Application No. 202080017717.0 dated Jul. 1, 2022.

(Continued)

*Primary Examiner* — Eric W Thomas
(74) *Attorney, Agent, or Firm* — ArentFox Schiff LLP (57) ABSTRACT

The electrolytic capacitor includes a capacitor body, the capacitor body including: a first end surface; a second end surface opposite to the first end surface; a bottom surface adjacent to the first end surface and the second end surface; a capacitor element including an anode line passing therethrough, a dielectric layer, and a cathode layer on the dielectric layer; and a sealing material covering the capacitor element, wherein the anode line has a first end exposed on the first end surface of the capacitor body, the electrolytic capacitor includes an anode external electrode on the first end surface of the capacitor body, the anode external electrode is connected to the first end of the anode line, the cathode layer is electrically led out to the bottom surface of the capacitor body, the electrolytic capacitor includes a cathode external electrode on the bottom surface of the (Continued)

capacitor body, and the cathode external electrode is electrically connected to the cathode layer.

18 Claims, 8 Drawing Sheets

(51) Int. Cl.
    *H01G 9/15*          (2006.01)
    *H01G 9/052*      (2006.01)

(56) References Cited

U.S. PATENT DOCUMENTS

| | | | | |
|---|---|---|---|---|
| 2006/0262489 | A1* | 11/2006 | Vaisman | H01G 9/15 361/540 |
| 2009/0154065 | A1* | 6/2009 | Choi | H01G 9/012 29/25.03 |
| 2011/0261503 | A1 | 10/2011 | Aoyama | |
| 2019/0228915 | A1 | 7/2019 | Furukawa | |
| 2020/0308429 | A1* | 10/2020 | Fukui | C09D 11/17 |

FOREIGN PATENT DOCUMENTS

| | | | |
|---|---|---|---|
| EP | 0518258 A1 | 12/1992 | |
| EP | 3226270 A1 | 10/2017 | |
| JP | S54174855 U | 12/1979 | |
| JP | S56172932 U | 12/1981 | |
| JP | 2004063543 A * | 2/2004 | ............ H01G 2/065 |
| JP | 2007250920 A | 9/2007 | |
| JP | 2011096746 A | 5/2011 | |
| JP | 2011243952 A | 12/2011 | |
| JP | 2016213347 A | 12/2016 | |
| JP | 2018082008 A | 5/2018 | |

OTHER PUBLICATIONS

Japanese Office Action issued for Japanese Application No. 2021-527234, dated Aug. 17, 2021.
Japanese Office Action issued for Japanese Application No. 2021-527234, dated Nov. 16, 2021.
Written Opinion of the International Searching Authority issued for PCT/JP2020/001558, dated Mar. 17, 2020.
International Search Report issued for PCT/JP2020/001558, dated Mar. 17, 2020.
Extended European Search Report in EP20863585.4, dated Sep. 5, 2023, 9 pages.

* cited by examiner

ELECTROLYTIC CAPACITOR AND MANUFACTURING METHOD OF ELECTROLYTIC CAPACITOR

CROSS-REFERENCE TO RELATED APPLICATIONS

This application is a National Phase of PCT/JP2020/001558, filed on Jan. 17, 2020, which claims priority to Japanese Patent Application No. 2019-163668, filed on Sep. 9, 2019, the entire contents of each of which are incorporated herein by reference.

TECHNICAL FIELD

The present invention relates to an electrolytic capacitor and a method of producing an electrolytic capacitor.

BACKGROUND ART

Solid electrolytic capacitors include, for example, one disclosed in Patent Literature 1 in which a dielectric oxide film and a conductive polymer layer are formed on or above an anode made of a sintered metal powder.

This solid electrolytic capacitor includes a rod-shaped metal member which is embedded in the anode in such a manner that it passes through the anode. The metal member includes a protrusion to which a metal member for a terminal is joined.

Patent Literature 2 discloses a solid electrolytic capacitor including a porous sintered body made of a valve-action metal and an anode wire protruding from the porous sintered body. Patent Literature 2 discloses in FIG. 20 an embodiment of such a solid electrolytic capacitor in which an end surface of the anode wire and an end surface of a sealing resin are exposed on the same plane and an anode external electrode is formed on these end surfaces.

CITATION LIST

Patent Literature

Patent Literature 1: JP 2007-250920 A
Patent Literature 2: JP 2016-213347 A

SUMMARY OF INVENTION

Technical Problem

The solid electrolytic capacitor according to Patent Literature 1 uses a lead frame to lead out each anode and a cathode to an anode external electrode and a cathode external electrode, respectively, located outside an exterior resin. With this structure, the paths leading to the external electrodes are long, which increases the equivalent series inductance (ESL).

In the solid electrolytic capacitor disclosed in Patent Literature 2, one end surface of the anode wire, which is opposite to the other end surface exposed on the plane where the end surface of the sealing resin is exposed, is embedded in the porous sintered body.

Thus, the resistance path between the anode and the cathode is long, which increases the equivalent series resistance (ESR).

The present invention was made to solve the above issues, and aims to provide an electrolytic capacitor having a lower equivalent series inductance (ESL) and a lower equivalent series resistance (ESR). The present invention also aims to provide a method of producing the electrolytic capacitor.

Solution to Problem

The electrolytic capacitor of the present invention includes a capacitor body, the capacitor body including: a first end surface; a second end surface opposite to the first end surface; a bottom surface adjacent to the first end surface and the second end surface; a capacitor element including an anode line passing therethrough, a dielectric layer, and a cathode layer on the dielectric layer; and a sealing material covering the capacitor element, wherein the anode line has a first end exposed on the first end surface of the capacitor body, the electrolytic capacitor includes an anode external electrode on the first end surface of the capacitor body, the anode external electrode is connected to the first end of the anode line, the cathode layer is electrically led out to the bottom surface of the capacitor body, the electrolytic capacitor includes a cathode external electrode on the bottom surface of the capacitor body, and the cathode external electrode is electrically connected to the cathode layer.

The method of producing an electrolytic capacitor of the present invention includes preparing a capacitor element including an anode line passing therethrough, a dielectric layer, and a cathode layer on the dielectric layer; mounting the cathode layer of the capacitor element on a first surface of a base; sealing the anode line and the capacitor element with a sealing material containing a first sealing resin; cutting the sealing material and the anode line to expose a first end of the anode line to obtain a cut surface as a first end surface of a capacitor body; and forming an anode external electrode on the first end surface of the capacitor body, and a cathode external electrode on a second surface of the base.

Advantageous Effects of Invention

The present invention can provide an electrolytic capacitor having a lower equivalent series inductance (ESL) and a lower equivalent series resistance (ESR).

DESCRIPTION OF EMBODIMENTS

The following describes an electrolytic capacitor of the present invention and a production method thereof.

The present invention is not limited to the following preferred embodiments, and may be suitably modified without departing from the gist of the present invention. The following preferred embodiments are examples, and features of different preferred embodiments can be partially exchanged or combined with each other. Combinations of two or more preferred features described in the following preferred embodiments are also within the scope of the present invention.

Electrolytic Capacitor of the First Embodiment

Figure 1A:
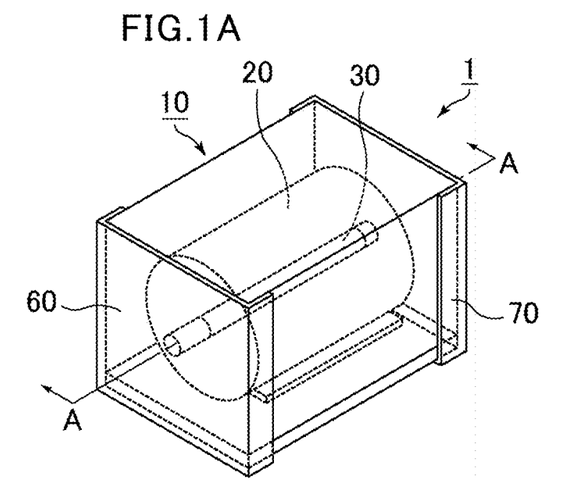
FIG. 1A is a schematic perspective view of an electrolytic capacitor according to a first embodiment of the present invention.
Figure 1B:
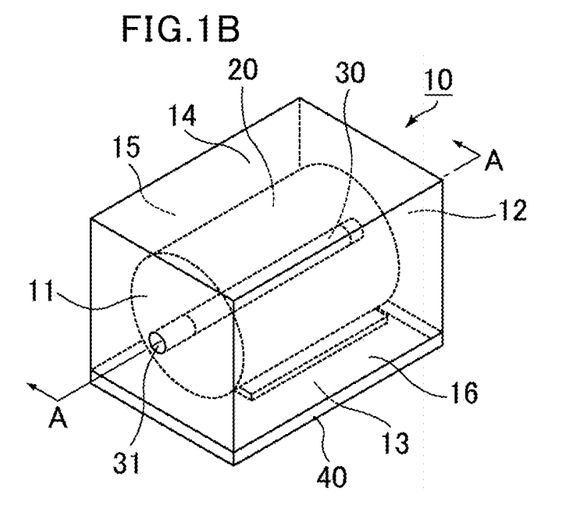
FIG. 1B is a schematic perspective view of a capacitor body defining an electrolytic capacitor.
Figure 1C:
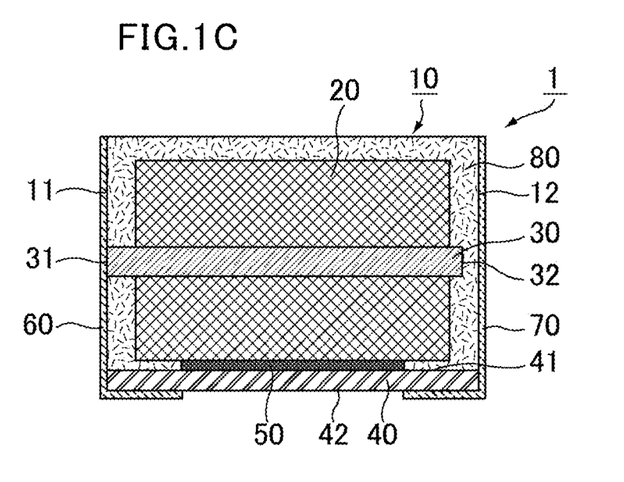
FIG. 1C is a cross-sectional view taken along line A-A of the electrolytic capacitor shown in FIG. 1A.

FIG. 1A is a schematic perspective view of an electrolytic capacitor according to a first embodiment of the present invention. FIG. 1B is a schematic perspective view of a capacitor body defining an electrolytic capacitor. FIG. 1C is a cross-sectional view taken along line A-A of the electrolytic capacitor shown in FIG. 1A.

An electrolytic capacitor 1 shown in FIG. 1A includes a capacitor body 10, and an anode external electrode 60 and a cathode external electrode 70 on the capacitor body 10.

FIG. 1B shows the capacitor body 10 of the electrolytic capacitor 1, excluding the anode external electrode 60 and the cathode external electrode 70, and shows positions of surfaces of the capacitor body 10, i.e., a first end surface 11 and a second end surface 12 opposite to each other, a bottom surface 13 and a top surface 14 opposite to each other, and a first side surface 15 and a second side surface 16 opposite to each other.

The capacitor body 10 includes a base 40 defining the bottom surface 13 of the capacitor body 10.

In the electrolytic capacitor 1 shown in FIG. 1A, the anode external electrode 60 is provided on the first end surface 11 of the capacitor body 10, and is further provided on a portion of the bottom surface 13, a portion of the first side surface 15, and a portion of the second side surface 16.

In the electrolytic capacitor 1 shown in FIG. 1A, the cathode external electrode 70 is provided on the second end surface 12 of the capacitor body 10, and is further provided on a portion of the bottom surface 13, a portion of the first side surface 15, and a portion of the second side surface 16.

The anode external electrode 60 and the cathode external electrode 70 each may not be provided on a portion of the first side surface 15 or a portion of the second side surface 16.

The capacitor body 10 includes a capacitor element 20 including an anode line 30 passing therethrough. The capacitor element and the anode line each may have a cylindrical shape in FIG. 1A and FIG. 1B, but may have a prismatic shape.

The cylindrical shape encompasses an oval shape, a flat shape, a prismatic shape whose corners are rounded, and a prismatic shape whose ridges are rounded.

The internal structure of the electrolytic capacitor is described with reference to FIG. 1C.

The capacitor body 10 includes the capacitor element 20 including the anode line 30 passing therethrough, and a sealing material 80 covering the capacitor element 20. The capacitor body 10 includes the base 40 defining the bottom surface 13 of the capacitor body 10.

The base 40 is adhered to the capacitor element 20 via a conductive adhesive 50 at a first surface 41 of the base 40.

The anode line 30 includes a first end 31 and a second end 32.

The first end 31 of the anode line 30 is exposed on the first end surface 11 of the capacitor body 10, and the first end 31 of the anode line 30 is connected to the anode external electrode 60.

The second end 32 of the anode line 30 passes through the capacitor element 20 and is in contact with the sealing material 80. The second end 32 is insulated from the cathode external electrode 70.

The capacitor element 20 includes the anode line 30 passing therethrough, a dielectric layer, and a cathode layer on the dielectric layer.

The structure of the capacitor element 20 is described with reference to FIG. 2.

Figure 2:
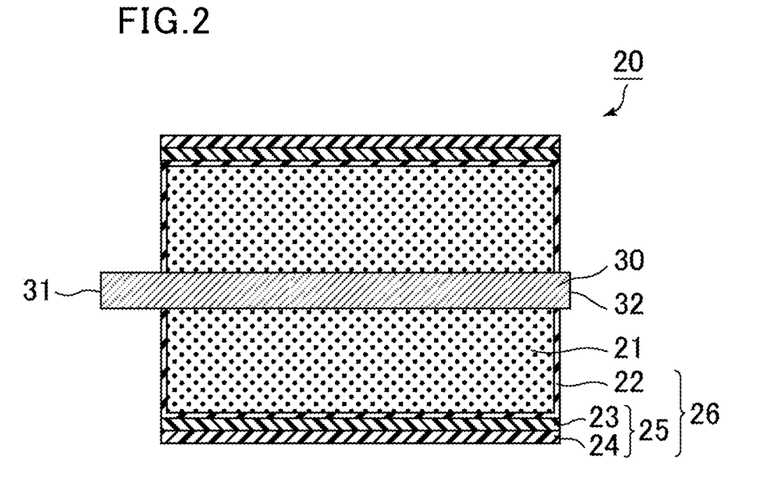
FIG. 2 is a schematic cross-sectional view of an example of a structure of a capacitor element.

FIG. 2 is a schematic cross-sectional view of an example of a structure of the capacitor element.

The capacitor element 20 includes the anode line 30 passing therethrough, a porous portion 21 made of a valve-action metal around the anode line 30, a dielectric layer (not shown) on fine pore surfaces of the porous portion 21, and a cathode layer 26 on the dielectric layer.

The anode line is a linear through conductor made of a valve-action metal. The valve-action metal is made of a metal, for example, an elemental metal such as aluminum, tantalum, niobium, titanium, or zirconium, or an alloy of these metals. Of these, aluminum or tantalum is preferred, and tantalum is more preferred.

Preferably, the porous portion is made of a valve-action metal, and is a porous body of the same type of metal as that of the valve-action metal defining the anode line.

Preferably, the porous portion is a porous sintered body produced by molding and sintering a powder of a valve-action metal. Alternatively, the porous portion may be an etching layer of the metal defining the anode line.

Preferably, the dielectric layer is an oxide of a valve-action metal defining the porous portion. Anodization (chemical conversion treatment) of a valve-action metal can form a dielectric layer including an oxide film on a surface of the porous portion.

In a preferred combination of the anode line, porous portion, and dielectric layer, the anode line is a tantalum metal line, the porous portion is a sintered tantalum metal, and the dielectric layer is an oxide of tantalum metal (e.g., tantalum pentoxide).

In another preferred combination, the anode line is an aluminum metal line, the porous portion is an etching layer on a surface of the aluminum line, and the dielectric layer is an oxide film (aluminum oxide) on the surface of the aluminum line. When the anode line is an aluminum metal line, preferably, the anode line is exposed by removing an end of the porous portion and the anode line passes through the capacitor element.

In addition, an insulation may be provided around the anode line exposed by removing the end of the porous portion, excluding a portion of the first end of the anode.

Alternatively, an insulation may be provided by impregnating the porous portion with an insulating resin and thus forming an insulating resin on the dielectric layer, instead of removing the end of the porous portion.

The cathode layer 26 includes a solid electrolyte layer 22 on the dielectric layer, and a conductive layer 25 on a surface of the solid electrolyte layer 22. FIG. 2 shows the conductive layer 25 having a two-layer structure of a carbon layer 23 and a silver layer 24.

An electrolytic capacitor including a solid electrolyte layer as an electrolyte layer is considered as a solid electrolytic capacitor.

The solid electrolyte layer 22 fills some of the fine pores of the porous portion 21, and is provided on the dielectric layer on the surface of the porous portion 21.

Examples of materials of the solid electrolyte layer include conductive polymers such as polypyrroles, polythiophenes, and polyanilines. Of these, polythiophenes are preferred, and poly(3,4-ethylenedioxythiophene) called PEDOT is particularly preferred. Examples of the conductive polymers may also include dopants such as poly(styrene sulfonate) (PSS). Preferably, the solid electrolyte layer includes an inner layer filling the fine pores (depressions) of the porous portion (dielectric layer) and an outer layer covering the dielectric layer.

Preferably, the conductive layer includes a carbon layer serving as an underlayer and a silver layer on the carbon layer, but may include only a carbon layer or a silver layer.

As shown in FIG. 1C, the cathode layer 26 is adhered to the first surface 41 of the base 40 via the conductive adhesive 50 at a lower side of the capacitor element 20. The cathode external electrode 70 is provided on a second surface 42 of the base 40 (the bottom surface 13 of the capacitor body 10). In this manner, the cathode layer 26 at the lower side of the capacitor element 20 is electrically connected to the cathode external electrode 70.

Preferably, the cathode external electrode is continuously provided on the bottom surface of the capacitor body and the second end surface of the capacitor body.

The base on the bottom surface of the capacitor body can be a printed board such as a copper clad double-sided board or a through hole board, or a base such as a metal base.

Preferably, the sealing material covering the capacitor element is made of a sealing resin. Examples of the sealing resin include an epoxy resin and a phenolic resin. The sealing material may also contain a filler such as alumina or silica, a magnetic material, and the like, in addition to the sealing resin.

Preferably, the anode external electrode and the cathode external electrode are each made of a plating film of a metal such as nickel, zinc, copper, tin, gold, silver, palladium, or lead, or an alloy containing these metals, for example; or a conductive resin film containing silver, copper, nickel, tin, palladium, or the like as a conductive component, for example. The anode external electrode and the cathode external electrode each may have a multilayer structure including a plating film and a conductive resin film. For example, the anode external electrode and the cathode external electrode may each include two plating layers and a conductive resin layer between these plating layers.

The electrolytic capacitor according to the first embodiment of the present invention is a two-terminal capacitor including the anode external electrode on the first end surface of the capacitor body and the cathode external electrode on the bottom surface of the capacitor body.

With regard to the anode external electrode, the first end of the anode line is exposed on the first end surface of the capacitor body and is connected to the anode external electrode at the first end surface of the capacitor body, so that the path leading to the external electrode is short.

With regard to the cathode external electrode, the cathode layer is led out to the bottom surface of the capacitor, so that the path leading to the cathode external electrode is shorter than that using a lead frame.

The paths leading to the anode external electrode and the cathode external electrode are both short, which results in an electrolytic capacitor having a low equivalent series inductance (ESL).

The anode line passes through the capacitor element. Thus, the resistance path between the anode and the cathode is short, which results in an electrolytic capacitor having a low equivalent series resistance (ESR).

Electrolytic Capacitor of the Second Embodiment

Figure 3:
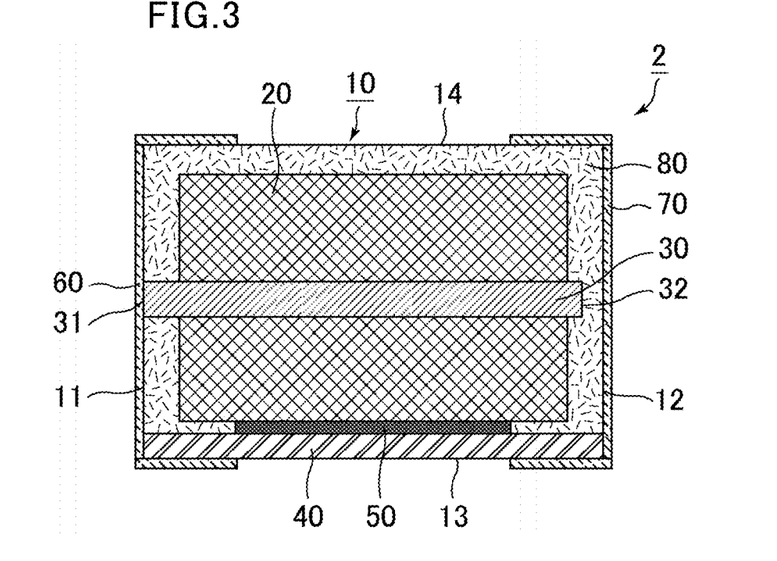
FIG. 3 is a schematic cross-sectional view of an electrolytic capacitor according to a second embodiment of the present invention.

FIG. 3 is a schematic cross-sectional view of an electrolytic capacitor according to a second embodiment of the present invention.

In an electrolytic capacitor 2 shown in FIG. 3, the cathode external electrode 70 is continuously provided on the bottom surface 13 and the second end surface 12 of the capacitor body 10, and is further continuously provided on the top surface 14 of the capacitor body 10.

The anode external electrode 60 is also continuously provided on the bottom surface 13 and the first end surface 11 of the capacitor body 10, and is further continuously provided on the top surface 14 of the capacitor body 10.

The electrolytic capacitor according to the second embodiment can have a structure similar to that of the electrolytic capacitor according to the first embodiment, except that the cathode external electrode and/or the anode external electrode are/is provided on the top surface of the capacitor body.

Electrolytic Capacitor of the Third Embodiment

Figure 4A:
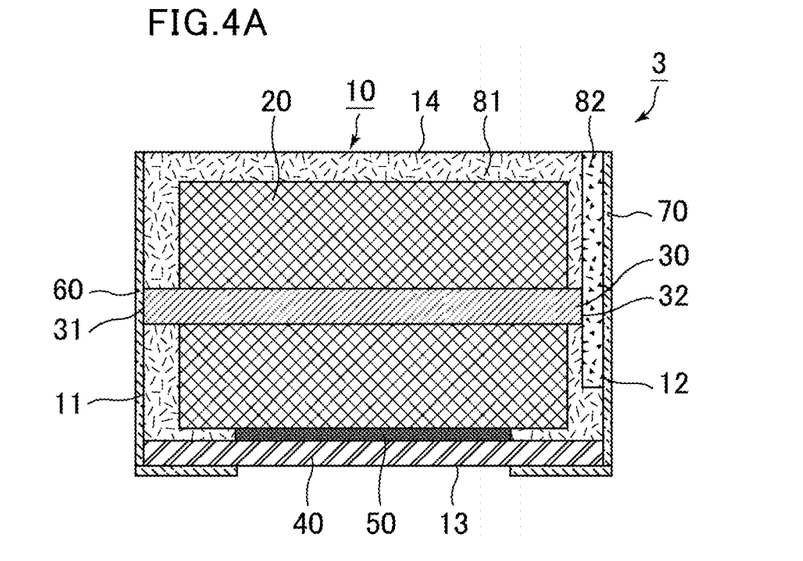
FIG. 4A is a schematic cross-sectional view of an electrolytic capacitor according to a third embodiment of the present invention.
Figure 4B:
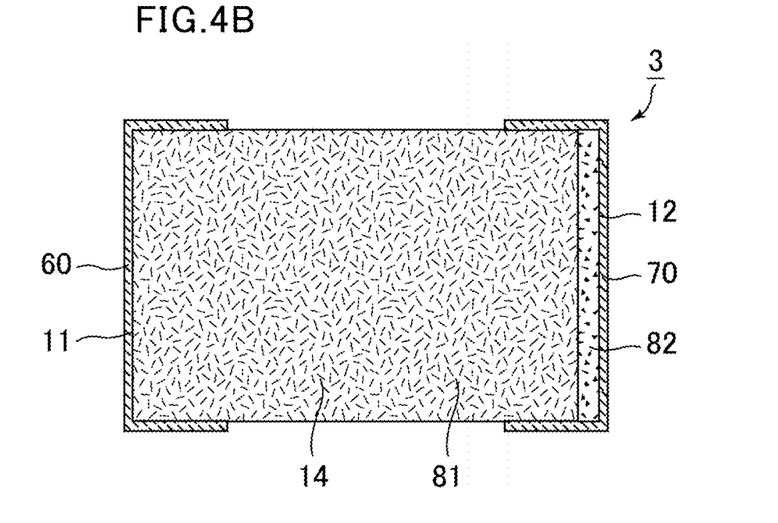
FIG. 4B is a top view of the electrolytic capacitor according to the third embodiment of the present invention.

FIG. 4A is a schematic cross-sectional view of an electrolytic capacitor according to a third embodiment of the present invention. FIG. 4B is a top view of the electrolytic capacitor according to the third embodiment of the present invention.

In an electrolytic capacitor 3 shown in FIG. 4A and FIG. 4B, the sealing material includes two or more sealing resins, and a difference between the two or more sealing resins is visually recognizable, allowing polarity to be distinguished by visual recognition of the sealing material.

In the electrolytic capacitor 3, the two or more sealing resins include a first sealing resin 81 that is a main resin covering a majority of the capacitor element 20 and a second sealing resin 82 different from the first sealing resin 81, and the second sealing resin 82 is exposed on the top surface 14 opposite to the bottom surface 13 of the capacitor body 10.

The position where the second sealing resin 82 is exposed on the top surface 14 of the capacitor body 10 is in the vicinity of the cathode external electrode 70. This makes it possible to distinguish at which end surface of the capacitor body 10 the cathode external electrode 70 is provided, by visual recognition of the position of the second sealing resin 82 from the top surface 14 of the capacitor body 10. In other words, the polarity of the electrolytic capacitor can be distinguished.

In the electrolytic capacitor 3, the second sealing resin 82 is in contact with the second end 32 of the anode line 30, on the second end surface 12 side of the capacitor body 10.

According to a preferred example of a method of producing an electrolytic capacitor of the present invention (described later), the second end 32 of the anode line 30 is in contact with the second sealing resin 82.

The second sealing resin 82 can be an insulating resin, so that the anode line 30 and the cathode external electrode 70 can be insulated from each other.

In the electrolytic capacitor 3, the second sealing resin 82 is exposed on the second end surface 12 of the capacitor body 10. This means that the second sealing resin 82 defines a surface that defines the second end surface 12 of the capacitor body 10. In the electrolytic capacitor 3, the cathode external electrode 70 is provided on a surface of the second sealing resin 82.

The method that makes it possible to visually recognize the difference between the first sealing resin and the second sealing resin is not limited, but the following method may be mentioned.

First, in one method, the types of resins are rendered different between the first sealing resin and the second sealing resin. Different types of resins result in different refractive indices between the first sealing resin and the second sealing resin, which enables visual recognition of a boundary between the first sealing resin and the second sealing resin.

For example, preferably, an epoxy resin is used as the first sealing resin as a main resin covering a majority of the capacitor element, and a phenolic resin is used as the second sealing resin different from the first sealing resin.

In addition, preferably, the thermal expansion coefficients of the first sealing resin and the second sealing resin are similar to each other, and preferably, the difference in thermal expansion coefficient between these two types of resins is 100 ppm/K or less.

In another method that makes it possible to visually recognize the difference between the first sealing resin and the second sealing resin, colorants or fillers are added to the sealing resins.

When colorants or fillers are added to the sealing resins, the same type of resin may be used for the first sealing resin and the second sealing resin. Different colors added by the colorants or different appearances due to the presence or absence of the fillers make it possible to visually recognize the difference between the first sealing resin and the second sealing resin.

Examples of the fillers to be added to the sealing resins include silica, alumina, and carbon.

The electrolytic capacitor according to the third embodiment can have a structure similar to that of the electrolytic capacitor according to the first embodiment, except that the sealing material includes two or more sealing resins and the difference between the two or more sealing resins is visually recognizable.

When the cathode external electrode and/or the anode external electrode are/is provided on the top surface of the capacitor body as in the case of the electrolytic capacitor according to the second embodiment, the formation position of the second sealing resin and the formation position(s) of the external electrode(s) are adjusted in such a manner that the second sealing resin is not hidden by the cathode external electrode and/or the anode external electrode(s) on the top surface of the capacitor body, so that the second sealing resin is visually recognizable.

The formation position of the second sealing resin is not limited to the vicinity of the cathode external electrode. The second sealing resin may be formed in the vicinity of the anode external electrode. Alternatively, the second sealing resin may be formed at a position where the second sealing resin is exposed on one of the side surfaces, one of the end surfaces, or the bottom surface of the capacitor body, so that the position of the second sealing resin is visually recognizable.

Electrolytic Capacitor of the Fourth Embodiment

Figure 5A:
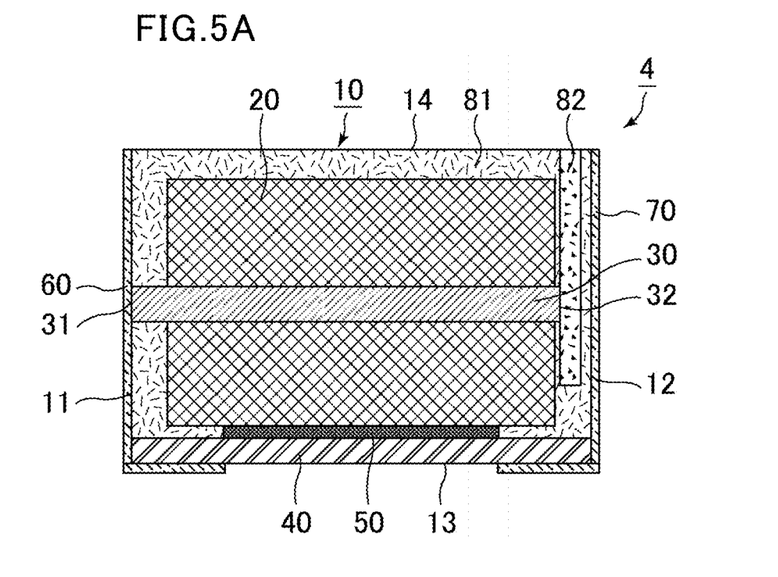
FIG. 5A is a schematic cross-sectional view of an electrolytic capacitor according to a fourth embodiment of the present invention.
Figure 5B:
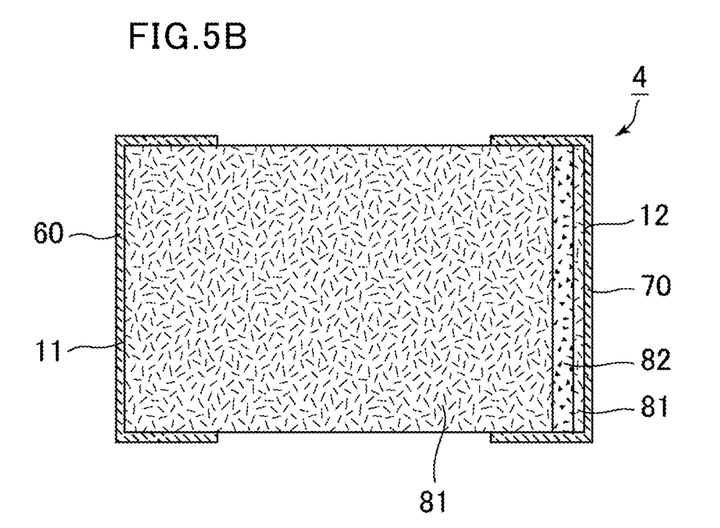
FIG. 5B is a top view of the electrolytic capacitor according to the fourth embodiment of the present invention.

FIG. 5A is a schematic cross-sectional view of an electrolytic capacitor according to a fourth embodiment of the present invention. FIG. 5B is a top view of the electrolytic capacitor according to the fourth embodiment of the present invention.

In an electrolytic capacitor 4 shown in FIG. 5A and FIG. 5B, the sealing material includes two or more sealing resins, and a difference between the two or more sealing resins is visually recognizable, allowing polarity to be distinguished by visual recognition of the sealing material, as is the case with the electrolytic capacitor according to the third embodiment.

In the electrolytic capacitor 4 shown in FIG. 5A and FIG. 5B, the second sealing resin 82 is not exposed on the second end surface 12 of the capacitor body 10, but the first sealing resin 81 is exposed on the second end surface 12 of the capacitor body 10.

As shown in FIG. 5B, in the top view, the second sealing resin 82 is between portions of the first sealing resin 81.

The second sealing resin 82 is in contact with the second end 32 of the anode line 30 at the second end surface 12 of the capacitor body 10.

According to a preferred example of the method of producing an electrolytic capacitor of the present invention (described later), the first sealing resin 81 and the second sealing resin 82 can be arranged to have a positional relationship as shown in FIG. 5A and FIG. 5B.

The electrolytic capacitor according to the fourth embodiment can have a structure similar to that of the electrolytic capacitor according to the third embodiment, except that the second sealing resin is formed at a different position.

Electrolytic Capacitor of the Fifth Embodiment

Figure 6:
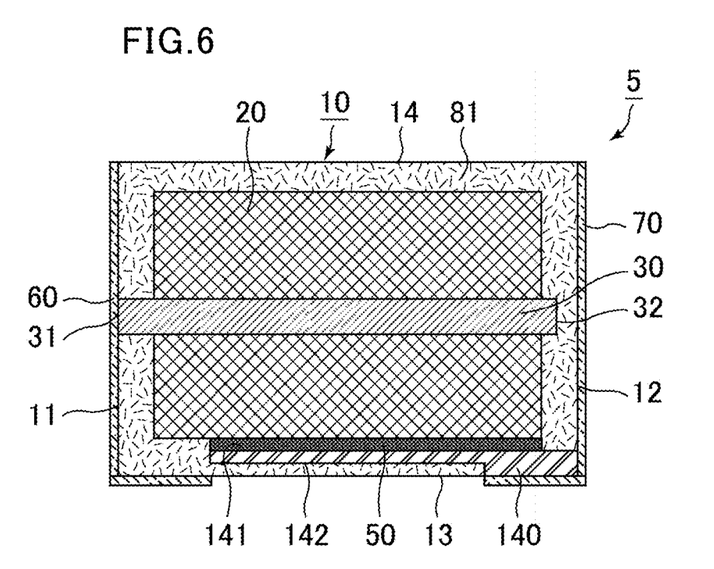
FIG. 6 is a schematic cross-sectional view of an electrolytic capacitor according to a fifth embodiment of the present invention.

FIG. 6 is a schematic cross-sectional view of an electrolytic capacitor according to a fifth embodiment of the present invention.

An electrolytic capacitor 5 shown in FIG. 6 includes a metal base 140, which is a patterned metal plate, to serve as a base adjacent to the bottom surface of the capacitor body.

In this case, the sealing resin 81 defines the bottom surface of the capacitor body 10.

A first surface 141 of the metal base 140 is electrically connected to the cathode layer 26 via the conductive adhesive 50, and the cathode external electrode 70 is provided on a second surface 142 of the metal base 140.

In this manner, the cathode layer 26 at the lower side of the capacitor element 20 is electrically connected to the cathode external electrode 70.

The electrolytic capacitor according to the fifth embodiment can have a structure similar to that of the electrolytic capacitor according to the first embodiment, except that base type and the arrangement of the sealing resin are different.

Electrolytic Capacitor of the Sixth Embodiment

Figure 7:
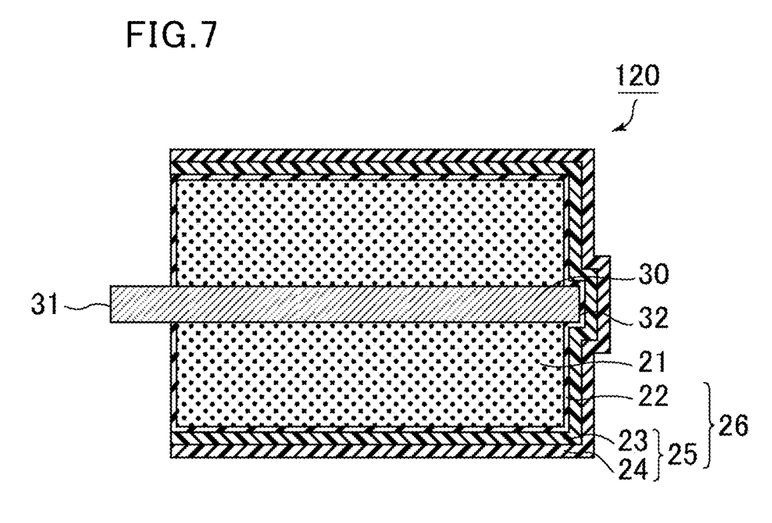
FIG. 7 is a schematic cross-sectional view of an example of a structure of a capacitor element defining an electrolytic capacitor according to a sixth embodiment of the present invention.

FIG. 7 is a schematic cross-sectional view of an example of a structure of a capacitor element defining an electrolytic capacitor according to a sixth embodiment of the present invention.

The electrolytic capacitor according to the sixth embodiment can have a structure similar to that of the electrolytic capacitor according to the first embodiment, except that the capacitor element has a different structure.

Thus, only the structure of the capacitor element is described below.

A capacitor element 120 shown in FIG. 7 is different from the capacitor element 20 shown in FIG. 2 in that the cathode layer 26 is provided on the end surface where the second end 32 of the anode line 30 passes through the capacitor element and is also provided on a surface of the second end 32 of the anode line 30.

The solid electrolyte layer 22 is on the surface of the second end 32 of the anode line 30, and the conductive layer 25 (a two-layer structure of the carbon layer 23 and the silver layer 24) is on the surface of the solid electrolyte layer 22.

The capacitor element 120 shown in FIG. 7 can be arranged at the position where the capacitor element 20 is arranged in FIG. 1C. In this case, the cathode layer 26 on the surface of the second end 32 of the anode line 30 is in contact with the sealing material 80, so that the second end 32 of the anode line 30 is insulated from the cathode external electrode 70.

The anode line passes through the porous portion in the capacitor element shown in FIG. 7, which is thus considered as an embodiment in which the anode line passes through the capacitor element.

In the method of producing an electrolytic capacitor described later, the capacitor element shown in FIG. 7 can be obtained by producing an electrolytic capacitor using a member including an anode line and only one porous portion adjacent to the anode line. When the anode line is not cut at the second end after the capacitor element is produced, a capacitor element can be obtained in which the cathode layer formed on the surface of the second end of the anode line during the production of the capacitor element remains the same.

Method of Producing Electrolytic Capacitor

The following describes a method of producing an electrolytic capacitor of the present invention, which enables production of the electrolytic capacitor of the present invention.

The method of producing an electrolytic capacitor of the present invention includes preparing a capacitor element including an anode line passing therethrough, a dielectric layer, and a cathode layer on the dielectric layer; mounting the cathode layer of the capacitor element on a first surface of a base; sealing the anode line and the capacitor element with a sealing material containing a first sealing resin; cutting the sealing material and the anode line to expose a first end of the anode line to obtain a cut surface as a first end surface of a capacitor body; and forming an anode external electrode on the first end surface of the capacitor body, and a cathode external electrode on a second surface of the base.

Preferably, the method of producing an electrolytic capacitor of the present invention includes cutting the sealing material and the anode line to expose the second end of the anode line, and filling a cut surface with the second sealing resin.

The following describes a method of producing an electrolytic capacitor, which includes filling a cut surface obtained by cutting the anode line with the second sealing resin. An electrolytic capacitor obtained by this step is the electrolytic capacitor shown in FIG. 4A and FIG. 4B, in which the sealing material includes two or more sealing resins, and a difference between the two or more sealing resins is visually recognizable, allowing polarity to be distinguished by visual recognition of the sealing material.

FIG. 8A, FIG. 8B, FIG. 8C, and FIG. 8D are schematic cross-sectional views of an example of the method of producing an electrolytic capacitor. FIG. 9A, FIG. 9B, and FIG. 9C are schematic cross-sectional views of an example of the method of producing an electrolytic capacitor.

First, a capacitor element is prepared which includes an anode line passing therethrough, a dielectric layer, and a cathode layer on the dielectric layer.

Figure 8A:
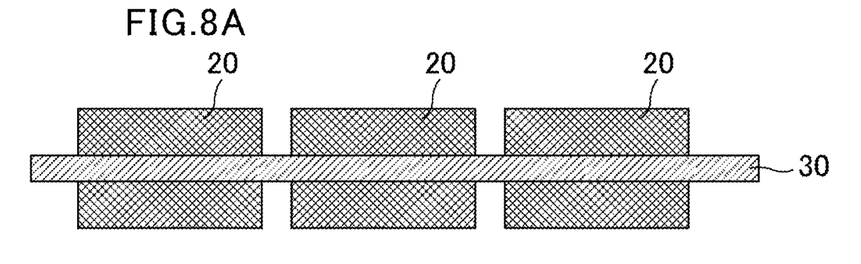
FIG. 8A, FIG. 8B, FIG. 8C, and FIG. 8D are schematic cross-sectional views of an example of a method of producing an electrolytic capacitor.
Figure 9A:
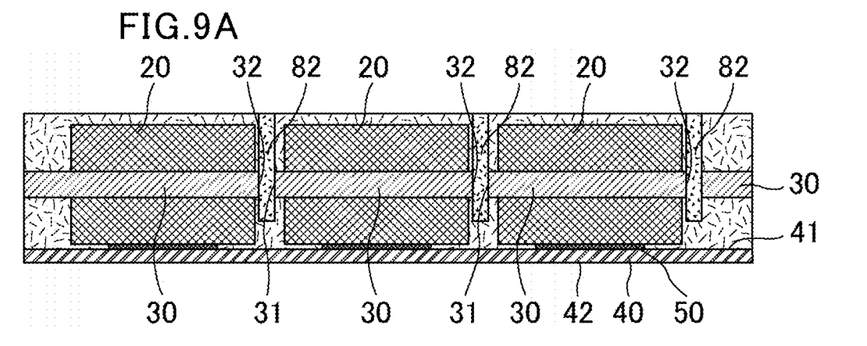
FIG. 9A, FIG. 9B, and FIG. 9C are schematic cross-sectional views of an example of the method of producing an electrolytic capacitor.
Figure 9B:
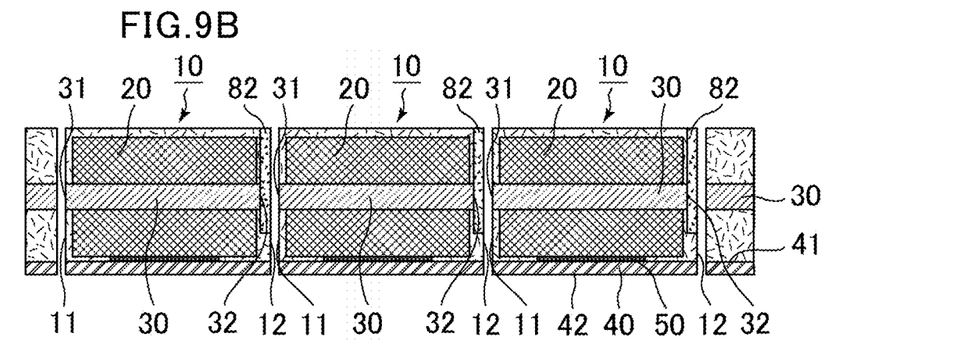
Figure 9C:
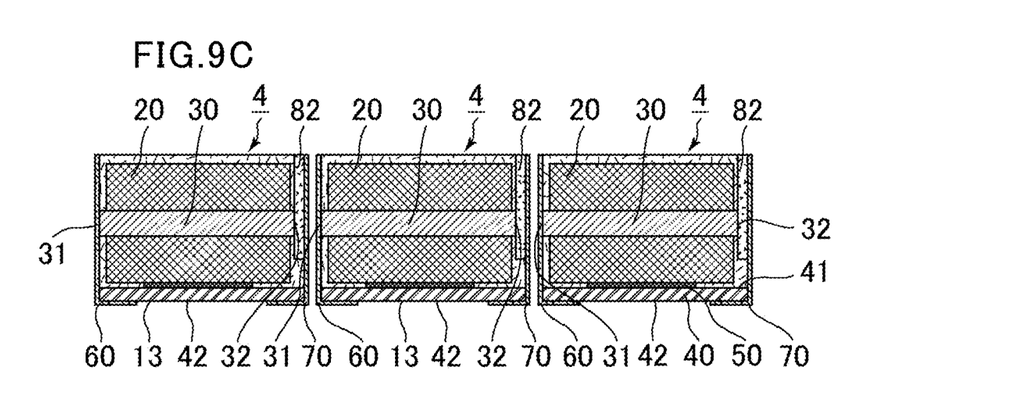

FIG. 8A shows the capacitor element 20 including the anode line 30 passing therethrough, a dielectric layer, and a cathode layer on the dielectric layer.

The capacitor element 20 can be produced as follows, for example.

A valve-action metal substrate is provided by producing a member including a linear conductor (e.g., tantalum metal line) as an anode line and multiple porous portions around the conductor. Preferably, each porous portion is a porous sintered body produced by molding and sintering a powder of a valve-action metal such as tantalum, aluminum, or niobium.

The porous portion is anodized to form a dielectric layer made of an oxide film on surfaces of the porous portions.

Subsequently, a cathode layer including a solid electrolyte layer, a carbon layer, and a silver layer is formed on the dielectric layer.

FIG. 8A shows arrangement of the capacitor elements 20 at three portions of the anode line 30.

Figure 8B:
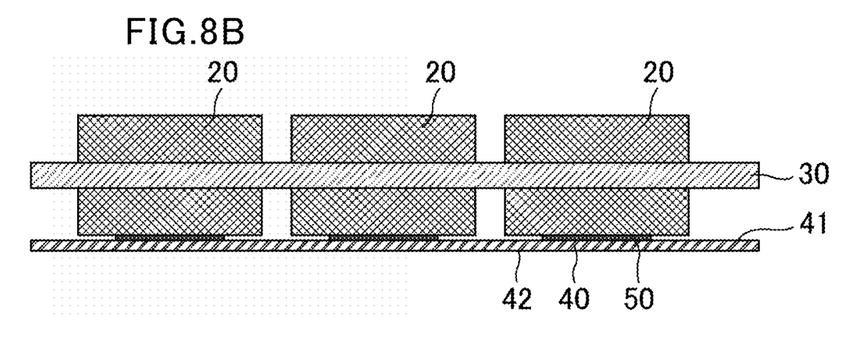

Subsequently, as shown in FIG. 8B, the base 40 is provided, and the cathode layer of each capacitor element 20 is mounted on the first surface 41 of the base 40.

The conductive adhesive 50 is provided between the cathode layer of each capacitor element 20 and the first surface 41 of the base 40, whereby the first surface 41 of the base 40 is adhered to the cathode layer of each capacitor element 20 via the conductive adhesive 50.

The base 40 includes repeated patterns according to the positions and the number of the capacitor elements 20, and the cathode layer of each capacitor element 20 through which the anode line 30 passes is electrically connected to the base 40 via the corresponding conductive adhesive 50.

When the base 40 is a copper clad double-sided board or a through hole board, for example, the cathode layer can be led out from the first surface 41 of the base 40 to the second surface 42 of the base 40.

Figure 8C:
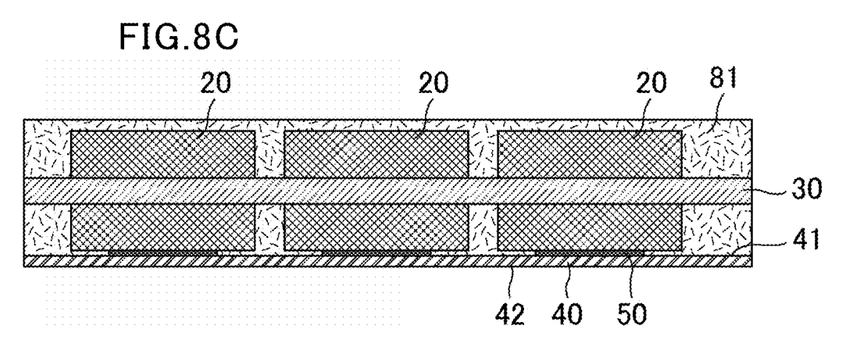

Subsequently, as shown in FIG. 8C, the anode line 30 and the capacitor element 20 are sealed with a sealing material containing the first sealing resin 81.

The first sealing resin is dried and cured, if necessary.

Figure 8D:
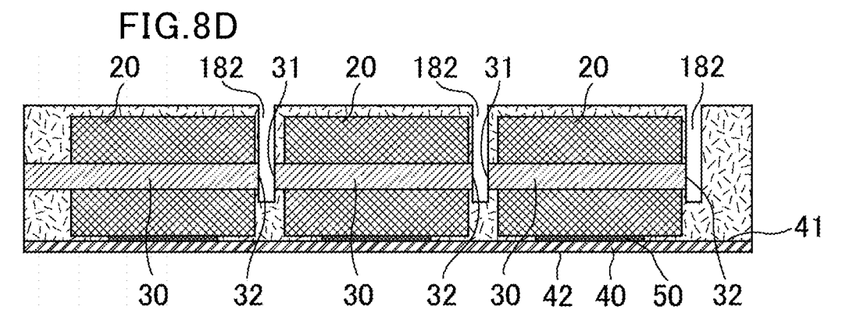

Subsequently, as shown in FIG. 8D, the sealing material (the first sealing resin 81) and the anode line 30 are cut.

The cutting is performed between the capacitor elements 20. The capacitor elements 20 are not cut.

It can be said that each first end 31 of the anode line 30 is exposed as a result of the cutting, while it can also be said that each second end 32 of the anode line 30 is exposed as a result of the cutting, if the focus is placed on the capacitor elements 20 that are adjacent to each other.

The cutting is performed in such a manner that the anode line 30 is cut all the way through and that the sealing material (the first sealing resin 81) under the anode line 30 (i.e., on the base 40 side) is cut halfway through. Thus, the capacitor elements 20 are not separated from each other by the cutting of the base 40.

Preferably, the cutting is performed by the dicing process using a blade having a certain degree of width, and a groove corresponding to the width of the blade is formed between the capacitor elements 20.

Subsequently, as shown in FIG. 9A, each groove 182 formed by the cutting, which is a portion where a cut surface of the second end 32 of the anode line 30 is exposed, is filled with the second sealing resin 82. The second sealing resin 82 is dried and cured, if necessary.

As a result of filling each of these portions with the second sealing resin 82, the second sealing resin 82 is in contact with the second end 32 of the anode line 30.

Subsequently, as shown in FIG. 9B, cutting is performed from the top surface of the sealing material (the first sealing resin 81 and the second sealing resin 82) all the way through the second surface 42 of the base 40 so as to expose each first end 31 of the anode line 30. Thus, each capacitor body 10 including the capacitor element 20 and the base 40 is separated.

The first end 31 of the anode line 30 is exposed on the first end surface 11 (i.e., a cut surface) of each capacitor body.

In the cutting shown in FIG. 9B, the cutting is performed along a plane including the second sealing resin 82 (i.e., the left side of the cut position). Thus, the second sealing resin 82 is exposed on the second end surface 12 of the capacitor body 10.

Subsequently, as shown in FIG. 9C, the anode external electrode 60 is formed on the first end surface 11 of each capacitor body 10, and the cathode external electrode 70 is formed on the second surface 42 of each base 40, which is the bottom surface 13 of each capacitor body 10.

The first end of the anode line is exposed on the first end surface 11 of each capacitor body 10. Thus, forming an external electrode at the exposed portion can result in the anode external electrode 60.

The cathode layer is led out to the second surface 42 of the base 40, which is the bottom surface 13 of the capacitor body 10. Thus, forming an external electrode at the lead-out portion can result in the cathode external electrode 70.

The electrolytic capacitor (the electrolytic capacitor 3 shown in FIG. 4A) can be produced by the above steps.

Preferably, the cathode external electrode is continuously provided on the second end surface of the capacitor body. Preferably, the cathode external electrode is further continuously provided on the top surface of the capacitor body.

Preferably, the anode external electrode is continuously provided on the bottom surface of the capacitor body. Preferably, the anode external electrode is further continuously provided on the top surface of the capacitor body.

As shown in FIG. 9B and FIG. 9C, when the first sealing resin 81 and the second sealing resin 82 are exposed on the top surface of each capacitor body 10, a difference between the two sealing resins is visually recognizable, making it possible to visually recognize that the side where the second sealing resin is provided is the cathode side.

To obtain the electrolytic capacitor 4 shown in FIG. 5A, the cutting is performed along a plane not including the second sealing resin 82 (i.e., the right side of the portion filled with the second sealing resin) by adjusting cutting positions in the cutting shown in FIG. 9B. The cut surface defines the second end surface of each capacitor body, and the first sealing resin 81 is exposed on each second end surface.

The first sealing resin 81 may be used in the filling of the grooves with the resin shown in FIG. 9A in order to obtain the electrolytic capacitor 1 shown in FIG. 1C.

The step that uses a member including a linear conductor as an anode line and multiple porous portions around the conductor as a valve-action metal substrate has been described so far, but the electrolytic capacitor may be produced using a member including an anode line and only one porous portion adjacent to the anode line.

In this case, the anode line and the capacitor element are sealed with a sealing material containing a sealing resin in such a manner that both of the first end and the second end of the anode line are covered.

Then, the sealing material and the anode line are cut only at the first end of the anode line to expose the first end of the anode line. The second end of the anode line is kept covered with the sealing material.

In this state, an anode external electrode is formed on the first end of the anode line, and a cathode external electrode is formed on the sealing material on the bottom surface of the capacitor body and at the second end of the anode line, whereby an electrolytic capacitor can be produced. The electrolytic capacitor produced by the above steps is the electrolytic capacitor 1 shown in FIG. 1C.

When an external electrode is further formed on the top surface of the capacitor body, the electrolytic capacitor 2 shown in FIG. 3 can be produced.

When the anode line is not cut at the second end after the capacitor element is produced, an electrolytic capacitor can be obtained which includes a capacitor element in which the cathode layer formed on the surface of the second end of the anode line during the production of the capacitor element remains the same (the capacitor element 120 shown in FIG. 7).

REFERENCE SIGNS LIST

1, 2, 3, 4, 5 electrolytic capacitor
10 capacitor body
11 first end surface
12 second end surface
13 bottom surface
14 top surface
15 first side surface
16 second side surface
20, 120 capacitor element
21 porous portion
22 solid electrolyte layer
23 carbon layer
24 silver layer
25 conductive layer
26 cathode layer
30 anode line
31 first end of anode line
32 second end of anode line
40 base
41 first surface of base
42 second surface of base
50 conductive adhesive
60 anode external electrode
70 cathode external electrode
80 sealing resin (sealing material)
81 first sealing resin
82 second sealing resin
140 metal base
141 first surface of metal base
142 second surface of metal base
182 groove formed by cutting

The invention claimed is:

1. An electrolytic capacitor comprising:
a capacitor body, the capacitor body comprising:
a first end surface;
a second end surface opposite to the first end surface;
a bottom surface adjacent to the first end surface and the second end surface;
a capacitor element including an anode line passing therethrough, a dielectric layer, and a cathode layer on the dielectric layer; and
a sealing material covering the capacitor element,
wherein the anode line has a first end exposed on the first end surface of the capacitor body,
the electrolytic capacitor includes an anode external electrode on the first end surface of the capacitor body,
the anode external electrode is connected to the first end of the anode line,
the cathode layer is electrically led out to the bottom surface of the capacitor body,
the electrolytic capacitor includes a cathode external electrode on the bottom surface of the capacitor body,
the cathode external electrode is electrically connected to the cathode layer, and
the capacitor element comprises a porous portion made of a metal of the anode line, and the porous portion is an etched layer on a surface of the anode line.

2. The electrolytic capacitor according to claim 1,
wherein the capacitor body comprises a base defining the bottom surface of the capacitor body,
the cathode layer of the capacitor element is adhered to a first surface of the base with a conductive adhesive,
the cathode external electrode is on a second surface of the base, and
the cathode layer is electrically connected to the cathode external electrode via the base.

3. The electrolytic capacitor according to claim 2, wherein the base is a copper clad double-sided board or a metal base.

4. The electrolytic capacitor according to claim 1, wherein the cathode external electrode is continuously provided on the bottom surface and the second end surface of the capacitor body.

5. The electrolytic capacitor according to claim 4, wherein the cathode external electrode is further continuously provided on a top surface opposite to the bottom surface of the capacitor body.

6. The electrolytic capacitor according to claim 1, wherein the anode external electrode is continuously provided on the bottom surface, the first end surface, and a top surface opposite to the bottom surface of the capacitor body.

7. The electrolytic capacitor according to claim 1,
wherein the capacitor element comprises a porous portion made of a valve-action metal, the dielectric layer on a surface of the porous portion, and the cathode layer on the dielectric layer, and
the cathode layer comprises a solid electrolyte layer on the dielectric layer and a conductive layer on a surface of the solid electrolyte layer.

8. An electrolytic capacitor comprising:
a capacitor body, the capacitor body comprising:
a first end surface;
a second end surface opposite to the first end surface;
a bottom surface adjacent to the first end surface and the second end surface;
a capacitor element including an anode line passing therethrough, a dielectric layer, and a cathode layer on the dielectric layer; and
a sealing material covering the capacitor element,
wherein the anode line has a first end exposed on the first end surface of the capacitor body,
the electrolytic capacitor includes an anode external electrode on the first end surface of the capacitor body,
the anode external electrode is connected to the first end of the anode line,
the cathode layer is electrically led out to the bottom surface of the capacitor body,
the electrolytic capacitor includes a cathode external electrode on the bottom surface of the capacitor body,
the cathode external electrode is electrically connected to the cathode layer, and
the sealing material comprises two or more sealing resins, and a difference between the two or more sealing resins is visually recognizable, allowing polarity to be distinguished by visual recognition of the sealing material.

9. The electrolytic capacitor according to claim 8,
wherein the two or more sealing resins comprise a first sealing resin that is a main resin covering a majority of the capacitor element and a second sealing resin different from the first sealing resin, and
the second sealing resin is exposed on a top surface opposite to the bottom surface of the capacitor body.

10. The electrolytic capacitor according to claim 8,
wherein the two or more sealing resins comprise a first sealing resin that is a main resin covering a majority of the capacitor element and a second sealing resin different from the first sealing resin, and
the second sealing resin is in contact with a second end of the anode line adjacent to the second end surface of the capacitor body.

11. The electrolytic capacitor according to claim 8,
wherein the two or more sealing resins comprise a first sealing resin that is a main resin covering a majority of the capacitor element and a second sealing resin different from the first sealing resin, and
the second sealing resin is exposed on the second end surface of the capacitor body.

12. An electrolytic capacitor comprising:
a capacitor body, the capacitor body comprising:
a first end surface;
a second end surface opposite to the first end surface;
a bottom surface adjacent to the first end surface and the second end surface;
a capacitor element including an anode line passing therethrough, a dielectric layer, and a cathode layer on the dielectric layer; and
a sealing material covering the capacitor element,
wherein the anode line has a first end exposed on the first end surface of the capacitor body,
the electrolytic capacitor includes an anode external electrode on the first end surface of the capacitor body,
the anode external electrode is connected to the first end of the anode line,
the cathode layer is electrically led out to the bottom surface of the capacitor body,
the electrolytic capacitor includes a cathode external electrode on the bottom surface of the capacitor body,
the cathode external electrode is electrically connected to the cathode layer,
the capacitor element comprises a porous portion made of a valve-action metal, the dielectric layer on a surface of the porous portion, and the cathode layer on the dielectric layer, and the cathode layer comprises a solid electrolyte layer on the dielectric layer and a conductive layer on a surface of the solid electrolyte layer, and wherein a second end of the anode line protrudes from the capacitor element at the second end side of the capacitor body, and at a part where the anode line protrudes from the capacitor element at the second end side of the capacitor body, the solid electrolyte layer and the conductive layer are not provided on the surface of the anode line.

13. The electrolytic capacitor according to claim 12, wherein the capacitor body comprises a base defining the bottom surface of the capacitor body, the cathode layer of the capacitor element is adhered to a first surface of the base with a conductive adhesive, the cathode external electrode is on a second surface of the base, and the cathode layer is electrically connected to the cathode external electrode via the base.

14. The electrolytic capacitor according to claim 13, wherein the base is a copper clad double-sided board or a metal base.

15. The electrolytic capacitor according to claim 12, wherein the cathode external electrode is continuously provided on the bottom surface and the second end surface of the capacitor body.

16. The electrolytic capacitor according to claim 15, wherein the cathode external electrode is further continuously provided on a top surface opposite to the bottom surface of the capacitor body.

17. The electrolytic capacitor according to claim 12, wherein the anode external electrode is continuously provided on the bottom surface, the first end surface, and a top surface opposite to the bottom surface of the capacitor body.

18. The electrolytic capacitor according to claim 12, wherein the capacitor element comprises a porous portion made of a valve-action metal, the dielectric layer on a surface of the porous portion, and the cathode layer on the dielectric layer, and the cathode layer comprises a solid electrolyte layer on the dielectric layer and a conductive layer on a surface of the solid electrolyte layer.

* * * * *